United States Patent
Polzin

(10) Patent No.: US 6,644,759 B1
(45) Date of Patent: Nov. 11, 2003

(54) METHOD AND DEVICE FOR CONTROLLING THE SLIPPAGE AT AT LEAST ONE VEHICLE WHEEL IN CLOSED LOOP

(75) Inventor: Norbert Polzin, Zaberfeld (DE)

(73) Assignee: Robert Bosch GmbH, Stuttgart (DE)

( * ) Notice: Subject to any disclaimer, the term of this patent is extended or adjusted under 35 U.S.C. 154(b) by 400 days.

(21) Appl. No.: 09/276,213

(22) Filed: Mar. 25, 1999

(30) Foreign Application Priority Data

Mar. 28, 1998 (DE) .......................... 198 13 985

(51) Int. Cl.$^7$ .............................. B60T 8/34; B60T 8/32
(52) U.S. Cl. ..................... 303/113.1; 303/191; 303/194
(58) Field of Search ........................... 303/113.1, 113.2, 303/119.1, 139, 163, 164, 165, 177, 191, 194, 195

(56) References Cited

U.S. PATENT DOCUMENTS

| | | | | |
|---|---|---|---|---|
| 3,663,070 A | * | 5/1972 | Scharlack | .................... 303/156 |
| 4,077,675 A | * | 3/1978 | Leiber et al. | ................ 303/156 |
| 4,947,332 A | * | 8/1990 | Ghoneim | ..................... 303/141 |
| 5,193,889 A | | 3/1993 | Schaefer et al. | ............ 303/100 |
| 5,295,738 A | * | 3/1994 | Matsuura et al. | ........... 303/158 |
| 5,584,541 A | * | 12/1996 | Sone et al. | .................. 303/146 |
| 5,662,393 A | * | 9/1997 | Kamiya et al. | ............. 303/194 |
| 6,050,652 A | * | 4/2000 | Kolbe et al. | ................ 303/191 |

FOREIGN PATENT DOCUMENTS

JP 4-138958 * 5/1992

* cited by examiner

*Primary Examiner*—Jack Lavinder
*Assistant Examiner*—Thomas J. Williams
(74) *Attorney, Agent, or Firm*—Kenyon & Kenyon

(57) ABSTRACT

A method and a device for controlling the slippage at at least one vehicle wheel in a closed loop. In order to reduce an unacceptable slippage at at least one wheel, the braking force at this wheel is influenced and wheel vibrations are determined. Furthermore, the tendency of the characteristic of the slippage is ascertained during a vibration, and the braking force is influenced as a function of the ascertained tendency.

13 Claims, 4 Drawing Sheets ered when carrying out the active braking intervention.

METHOD AND DEVICE FOR CONTROLLING THE SLIPPAGE AT AT LEAST ONE VEHICLE WHEEL IN CLOSED LOOP

FIELD OF THE INVENTION

The present invention relates to a method and a device for controlling the slippage at a vehicle wheel in closed loop.

BACKGROUND INFORMATION

U.S. Pat. No. 5,193,889 describes a known method and system in which measures are proposed for controlling vibrations in the speed of at least one wheel, e.g., during an anti-lock control or a traction control. In response to a detected wheel vibration, the brake pressure is influenced in order to avoid an amplitude increase of the vibration. However, in this situation, the closed-loop control itself is impaired in this manner, since during a vibration, the suppression of the vibration and not the closed-loop control itself is in the fore.

SUMMARY OF THE INVENTION

An object of the present invention is to control vibrations at at least one wheel during a braking intervention independent of the driver, and nevertheless not to restrict the braking control itself too much.

An active braking intervention, be it within the framework of a traction control, an anti-lock control, or an operating-dynamics control, is considerably improved, since wheel vibrations are damped and at the same time, the performance of the braking control itself is not substantially impaired. The same holds true for axle vibrations, in which both wheels of an axle vibrate.

It is particularly advantageous that the control comfort is improved during a traction control, accompanied by simultaneous, optimal traction of the vehicle.

Furthermore, it is of special importance that no additional hardware is necessary to carry out the measures.

DETAILED DESCRIPTION

Figure 1:
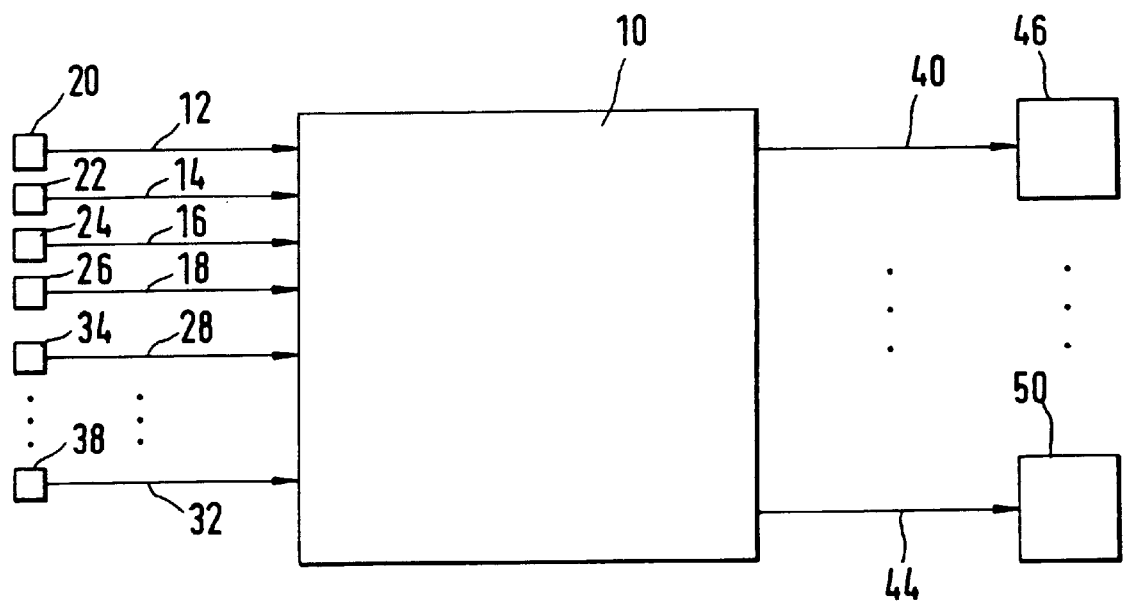
FIG. 1 shows a survey diagram of a control unit for carrying out the active braking intervention.

FIG. 1 shows a survey diagram of a control unit for carrying out the active braking intervention. The control system is used for carrying out a traction control; in other embodiments, alternatively or additionally, it is used for carrying out an anti-lock function and/or a driving-stability control. Provision is made for a control unit 10 which has at least one microcomputer. Performance quantities are fed to control unit 10 via input lines, the performance quantities being evaluated for carrying out the provided function(s).

The wheel-speed signals of the individual vehicle wheels are supplied to control unit 10 from corresponding measuring devices 20, 22, 24 and 26, via input lines 12, 14, 16, 18. In addition, provision can be made for input lines 28 through 32 which supply further performance quantities such as brake-pressure signals, the vehicular velocity, etc., from corresponding measuring devices 34 through 38. To influence the brake pressures in the individual wheel brakes, provision is made for output lines 40 through 44, via which valve arrangements and pump(s) 46 through 50 influencing the brake pressure are actuated within the sense of the implemented function. Such arrangements are known both for hydraulic and for pneumatic braking systems. If a braking system having purely electrical brake application is used, instead of valves and pump(s) 46 through 50, electric motors are provided which are activated via output lines 40 through 44 within the sense of the implemented function.

Particularly in the drive case, some vehicles tend to experience wheel and/or axle vibrations. In this case, the speed of an affected wheel (and thus its drive slip) shows an oscillating characteristic. This reduces the control performance of a traction control system (ASR). Above all under micron-split conditions, one has to expect a considerable influence. The following described procedure makes it possible to modulate the wheel pressure, even given an oscillating characteristic of the slippage or of a wheel speed, in such a way that the traction is increased and the control comfort is optimized simultaneously by selective build-ups and reductions in pressure.

As generally known, in response to the occurrence of drive slip, the wheel pressure is controlled as a function of the wheel slip and/or the wheel acceleration, along the lines of a reduction in the drive slip. In so doing, the extent of the pressure change follows the characteristic of at least one of these variables. In response to a sign change, preferably in response to the first sign change of the wheel-acceleration signal during a closed-loop control, a filter mark DRAFILT is set. This remains set until the wheel-acceleration signal is longer than a predefined filter time (e.g. 300 to 500 msec), greater or less than a threshold value (e.g. 0 g). In other words, the mark defines a time period while a check is being made for vibrations.

If DRAFILT is set, in response to an existing vibration, the identical vibrational state is ascertained. In the preferred exemplary embodiment, the vibration maximum or the vibration minimum is determined by an acceleration threshold value. In other embodiments, the identical vibrational state is determined with the aid of other variables characterizing a vibration, such as zero crossings, etc.

In response to the first recognition of this state, the prevailing slippage value SLIP is stored as slippage value SLIP_OLD. If the next identical vibrational state or one of the next states is recognized, the slippage value SLIP prevailing then is compared to a stored reference slippage value. Derived from this is a tendency for the characteristic of the slip during the vibration, i.e., it is determined whether the slip shows a tendency to a reduction or to an increase. If a tendency is shown h to a reduction, pressure is reduced in a defined manner in the affected wheel brake; in the reverse case, pressure is built up in a defined manner.

In the preferred exemplary embodiment, a hysteresis is provided for determining the tendency. For example, a reduction tendency is recognized when the deviation between the prevailing and the stored slippage value is less than a predetermined value (e.g. 2 km/h) or an appropriate percentage, while an increase tendency is recognized when the deviation between the prevailing and the stored slippage value is greater then a predetermined value (e.g. 2 km/h) or an appropriate percentage.

In the preferred exemplary embodiment, the pressure influence during the vibration is realized by the output of a suitable pulse with subsequent pause time, the pulse length being definitively predefined, or being a function of the size of the deviation between the prevailing and the stored slippage value.

If a pressure influence has been carried out at set mark DRAFILT, prevailing slippage value SLIP is stored as comparison value SLIP_OLD.

If mark DRAFILT is not set, the pressure is modulated as known according to the wheel characteristic.

Besides the use of the procedure in the case of traction control, it is also used, with correspondingly reversed conclusion, in the case of anti-lock controllers. A further application area is the use during an active braking intervention of a driving-stability controller.

If a braking system having electrical brake application is used, the braking force or the braking torque is controlled instead of the brake pressure. Accordingly, a motion of the servomotor(s) is brought about as a function of the ascertained tendency. In this context, braking force is understood as the generalization of the technical variables of brake pressure, braking force, braking torque, etc.

Figure 2A:
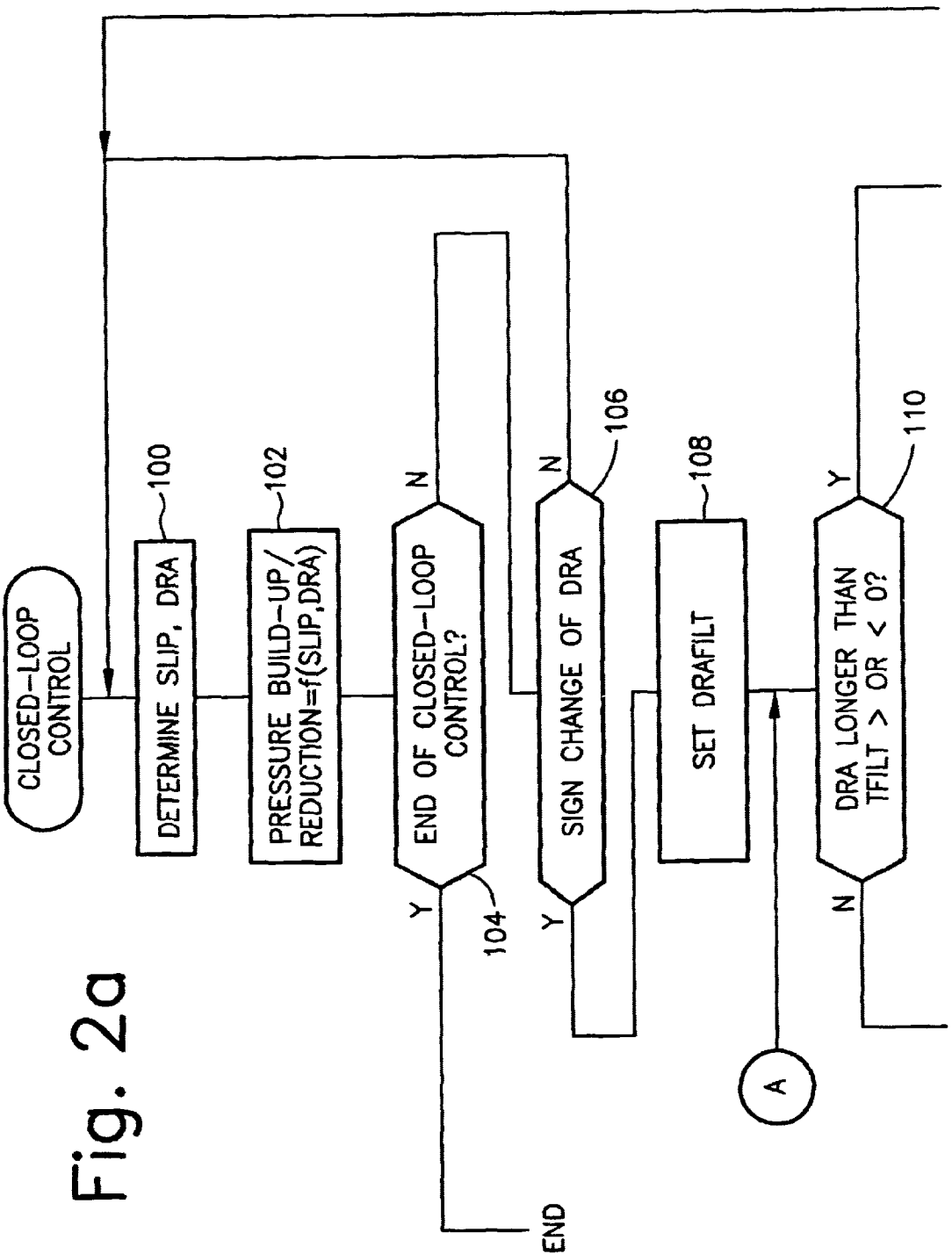
FIG. 2 shows a flow chart which represents a program, implemented in the microcomputer of the control unit, for carrying out the present invention.
Figure 2B:
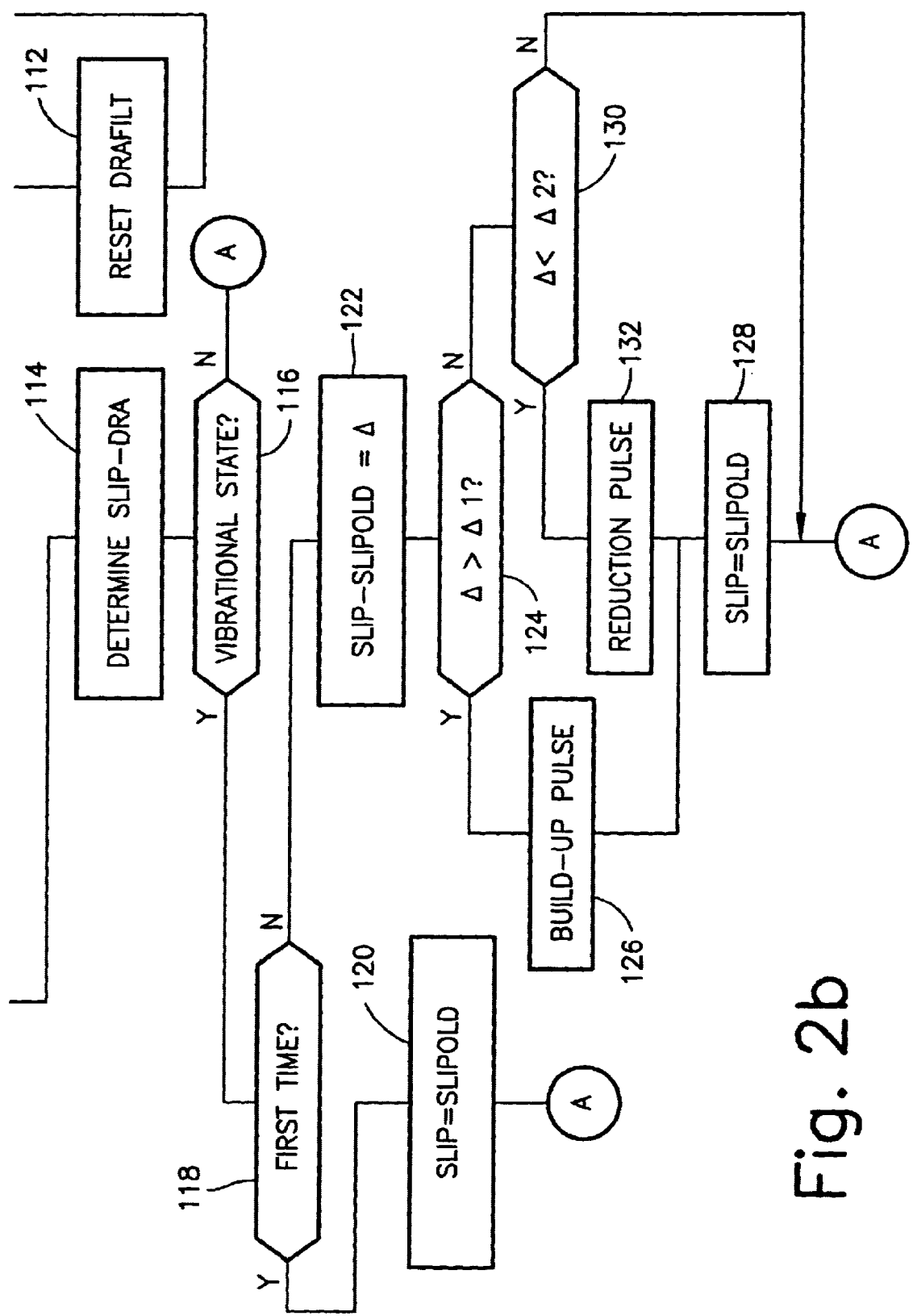

In light of a flow chart, FIG. 2 shows a preferred implementation of the described procedure as a program of the microcomputer of control unit 10.

The sketched program is initiated at the start of a traction control, when a spin tendency has been detected at a drive wheel for the first time. Further program runs or programs are provided for the other drive wheel(s). In first step 100, slippage SLIP for one drive wheel is ascertained on the basis of the wheel speed of the corresponding drive wheel and of at least one further wheel speed, for example, by comparison. In addition, acceleration DRA of this wheel is determined, e.g., by subtraction or differentiation. Thereupon, according to step 102, the pressure build-up or the pressure reduction is controlled as known for the affected wheel as a function of the slippage SLIP and/or the wheel acceleration DRA. After that, in step 104, it is checked whether the closed-loop control has ended, i.e., whether no unacceptable slippage exists any longer at the affected wheel and the pressure is completely reduced. If this is the case, the program is ended, at least for the affected wheel.

Otherwise, on the basis of the prevailing signal and a previous signal, it is checked in step 106 whether a sign change of acceleration signal DRA has taken place. If this is not the case, the program is repeated with step 100. In the event of a yes response, mark DRAFILT is set in step 108.

In the following step 110, it is queried whether acceleration signal DRA is longer than predefined filter time TFILT (e.g. 300–500 msec), lies above or below a limiting value, e.g., zero. If this is the case, there is no vibration, so that according to step 112, mark DRAFILT is reset. Thereupon, the program is repeated with step 100.

If the condition in step 110 is not met, in step 114, as in step 100, wheel slip SLIP and wheel acceleration DRA are determined. Thereupon, in step 116, it is checked whether the predefined vibrational state exists. For instance, the maximum or the minimum of the acceleration signal is ascertained.

If such a state does not exist, the program is repeated with step 110. Otherwise, in light of a mark, not shown, it is determined in step 118 whether the state was ascertained for the first time. If this is the case, in step 120, the prevailing slippage value SLIP is stored as SLIP_OLD. The program is thereupon repeated with step 110.

If the vibrational state was not determined for the first time, in step 122, the deviation delta between prevailing slippage value SLIP ascertained in step 114 and stored slippage value SLIP_OLD is formed, e.g., by subtraction. Thereupon, in step 124, the deviation delta is compared to a limiting value delta 1 (e.g. 2 km/h). If the deviation is greater than the limiting value, the slippage on average is becoming greater, so that according to step 126, pressure is built up, e.g., by output of a predefined, or slip-dependent and/or acceleration-dependent build-up pulse. After step 126, in step 128 the prevailing slippage value SLIP is stored as reference value SLIP_OLD, and the program is repeated with step 110.

If the response in step 124 is "no," in step 130, it is checked whether the deviation is less than a limiting value delta 2 (e.g., −2 km/h). If the deviation is less than the limiting value, the slippage on average is becoming less, so that according to step 132, pressure is reduced, e.g., by output of a predefined or slip-dependent and/or acceleration-dependent reduction pulse. After step 132, in step 128, the prevailing slippage value SLIP is stored as reference value SLIP_OLD, and the program is repeated with step 110.

If the deviation is not less than the limiting value, the slippage on average is remaining constant, so than no intervention is carried out. The program is repeated with step 110.

Figure 3A:
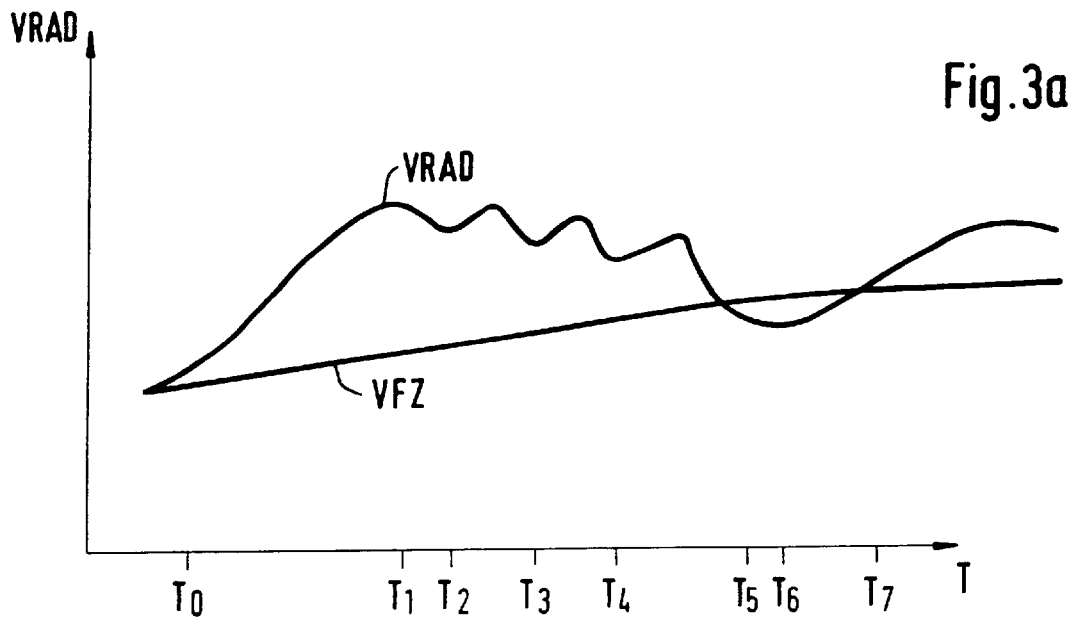
FIG. 3a shows a first timing diagram illustrating an operation of the present invention.
Figure 3B:
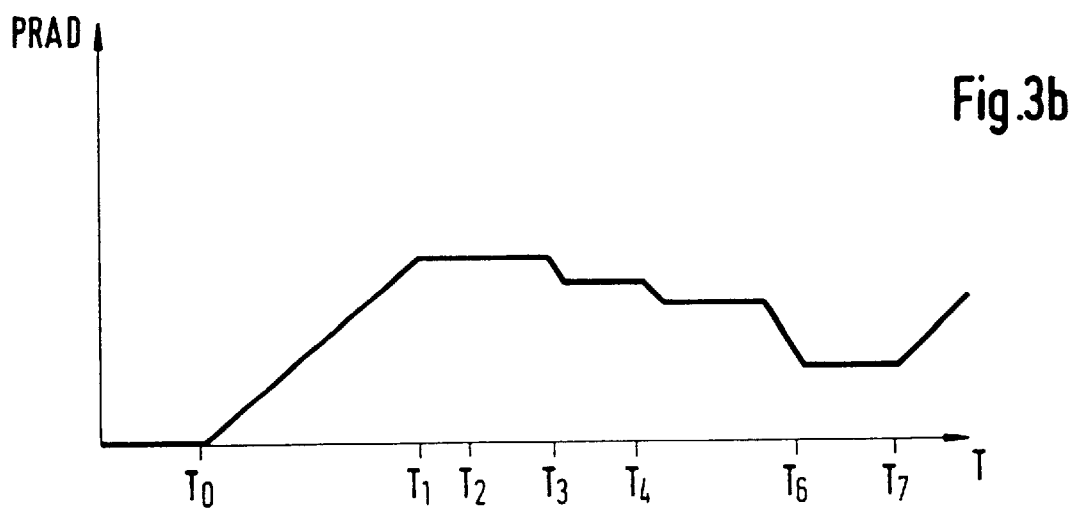
FIG. 3b shows a second timing diagram illustrating an operation of the present invention.
Figure 3C:
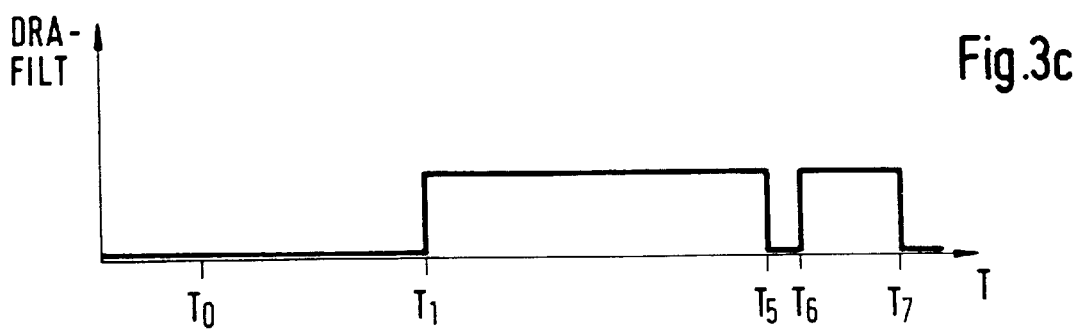
FIG. 3c shows a third timing diagram illustrating an operation of the present invention.

The operating mode of this procedure is elucidated in the timing diagrams of FIGS. 3a–3c. FIG. 3a shows the characteristic curve of velocity VRAD of a drive wheel over time, as well as the characteristic curve of vehicle velocity VFZ over time. FIG. 3b shows the characteristic curve of brake pressure PRAD at this wheel over time. FIG. 3c shows the time characteristic of mark DRAFILT.

As shown in FIG. 3a, at instant T0, a spin tendency of a drive wheel is detected. This leads to a pressure build-up in this wheel according to FIG. 3b. At instant T1, the wheel-acceleration signal changes its operational sign, i.e., a maximum of the speed signal is passed through (compare FIG. 3a). In the exemplary embodiment shown, this leads to a termination of the pressure build-up and to the setting of mark DRAFILT (compare FIGS. 3b and c). After the instant, wheel vibrations are indicated in FIG. 3a. The above-described procedure is run through. In the exemplary embodiment shown, the minima of the speed signal, i.e., the zero crossings of the acceleration signal, are drawn upon to ascertain the identical vibrational state. In other embodiments, different characteristic variables such as the maxima or minima of the acceleration signal are monitored. Nothing changes in the mode of operation because of this. At instant T2, the vibrational state is recognized for the first time. The slippage value (e.g. the difference with respect to the traveling speed) is stored as the reference value. At instant T3, the vibrational state is ascertained a second time. A comparison of the prevailing slippage value to the stored value yields that a tendency to the decrease of slippage exists. Therefore, at instant T3 according to FIG. 3b, pressure is reduced. The corresponding is done at instant T4, as well, the stored slippage value at instant T3 being taken as a basis for the comparison. According to that, the vibration has died out. At instant T5, the maximum filter time is exceeded, without the acceleration signal having exceeded the limiting values. According to FIG. 3c, this leads to a resetting of mark DRAFILT, whereupon the pressure modulation is again carried out as a function of slippage and/or wheel acceleration. In the case shown, this leads to a pressure reduction (compare FIG. 3b). At instant T6, the sign of the acceleration signal changes once more (compare FIG. 3a). The mark is set as shown in FIG. 3c. The pressure remains constant (compare FIG. 3b). This time, no vibration occurs. After the expiration of the filter time at instant T7, the mark is reset, and the pressure modulation commences again as a function of slippage and/or wheel acceleration (compare FIG. 3c and pressure build-up FIG. 3b). In so doing, the pressure change follows the characteristic of at least one of these variables.

The described procedure is used not only in connection with a traction control system, but also in the case of braking interventions of an anti-lock control system or a stability control, during which wheel vibrations or axle vibrations can occur. The tendency of the slippage during the vibration is determined here as well, and appropriate measures are carried out for the braking-force control.

What is claimed is:

1. A method for controlling a slippage occurring at at least one wheel of a vehicle of a vehicle in a closed loop to reduce the slippage at the at least one wheel, comprising the steps of:
    ascertaining a vibration at the at least one wheel;
    ascertaining a tendency of a characteristic of the slippage during the vibration; and
    influencing a braking force as a function of the ascertained tendency;
    wherein the tendency of the characteristic of the slippage is ascertained by comparing a subsequent slippage value to a previous slippage value.

2. The method according to claim 1, wherein when the vibration occurs during a traction control, the step of influencing the braking force includes the steps of:
    increasing the braking force when the ascertained tendency of the characteristic of the slippage indicates an increase in the slippage, and
    reducing the braking force when the ascertained tendency of the characteristic of the slippage indicates a decrease in the slippage.

3. The method according to claim 1, wherein when the vibration occurs during an anti-lock control, the step of influencing the braking force includes the steps of:
    increasing the braking force when the ascertained tendency of the characteristic of the slippage indicates a decrease in the slippage, and
    reducing the braking force when the ascertained tendency of the characteristic of the slippage indicates an increase in the slippage.

4. The method according to claim 1, wherein the step of ascertaining the tendency of the characteristic of the slippage includes the step of:
    ascertaining the tendency of the characteristic of the slippage in at least one vibrational state by storing at least one reference value for the slippage and comparing the at least one reference value to a prevailing slippage value when the at least one vibrational state occurs at a subsequent time.

5. The method according to claim 4, wherein:
    a tendency to an increase is recognized when the comparison yields an increase in the slippage, and
    a tendency to a decrease is recognized when the comparison yields a decrease in the slippage.

6. The method according to claim 1, wherein the step of influencing the braking force includes the step of:
    changing the braking force by a predetermined quantity as a function of a plurality of performance quantities.

7. The method according to claim 1, wherein the step of ascertaining the tendency of the characteristic of the slippage is performed when an operational sign of an acceleration of the at least one wheel changes.

8. The method according to claim 1 wherein one of a control of the braking force outside of a range in which vibrations exist and a procedure for ascertaining the tendency of the characteristic of the slippage is effected as a function of at least one of the slippage and an acceleration.

9. The method according to claim 1, wherein:
    a control of the braking force is achieved by influencing a brake pressure,
    a build-up pulse is provided in response to the ascertained tendency of the characteristic of the slippage indicating an increase, and
    a reduction pulse is provided in response to the ascertained tendency of the characteristic of the slippage indicating a decrease.

10. A device for controlling a slippage occurring at at least one wheel of a vehicle in a closed loop, comprising:
    a control unit for reducing the slippage and including:
        an arrangement for ascertaining a vibration at the at least one wheel,
        an arrangement for ascertaining a tendency of a characteristic of the slippage during the vibration at the at least one wheel, and
        an arrangement for influencing a braking force as a function of the ascertained tendency;
    wherein the tendency of the characteristic of the slippage is ascertained by comparing a subsequent previous slippage value to a previous slippage value.

11. A method for controlling and reducing slippage of at least one wheel of a vehicle, the method comprising the steps of:
    determining a slippage parameter;
    determining an acceleration parameter;
    activating a timer for a period;
    ascertaining a vibrational state of the slippage parameter based on the slippage parameter and the acceleration parameter during the period; and
    modifying a brake pressure during the vibrational state.

12. The method of claim 11, wherein the step of modifying the brake pressure is performed based on the slippage parameter.

13. A system for controlling and reducing slippage of at least one wheel of a vehicle, the system comprising:
    means for determining a slippage parameter;
    means for determining an acceleration parameter;
    means for activating a timer for a period;
    means for ascertaining a vibrational state of the slippage parameter based on the slippage parameter and the acceleration parameter during the period; and
    means for modifying a brake pressure during the vibrational state.

* * * * *